Patented Dec. 24, 1946

2,412,985

UNITED STATES PATENT OFFICE 2,412,985

VULCANIZATION OF RUBBER

William H. Hill, Mount Lebanon, Pa., assignor, by mesne assignments, to Koppers Company, Inc., a corporation of Delaware No Drawing. Application May 24, 1944, Serial No. 537,179

19 Claims. (Cl. 260—797)

The present invention relates to vulcanization of rubber and to rubber compositions or such compositions vulcanized in the presence of accelerators, and of accelerators and activators herein described.

In connection with the present invention it has been found that compounds formed from a thiocyanate and amidine bases having the characteristic guanyl grouping are highly desirable agents in vulcanization accelerators and particularly as activators for accelerators such as thiazole accelerators including mercapto-arylthiazoles, benzothiazyl thiobenzoate, dibenzothiazyl disulfide and others. Though amidine thiocyanates have in themselves accelerating properties, it is noted that they are particularly valuable for commercial purposes as activators for accelerators in various rubber stocks.

Specific examples of compounds employed herein for the purposes defined include diphenyl guanidine thiocyanate, such alkaryl amidine thiocyanates as diorthotolyl guanidine thiocyanate and dixylylguanidine thiocyanate, and also dinaphthylguanidine thiocyanate, guanyl urea thiocyanate and the like. In addition to these, other amidine thiocyanates are used including biguanide thiocyanates such as tolyl biguanide thiocyanate and the like, but the latter are found to be not as effective.

Compounds of the type employed in the present invention are readily prepared by any one of several methods. For example, diphenyl guanidine thiocyanate is prepared by heating together an aqueous solution of ammonium thiocyanate and diphenyl-guanidine in stoichiometric proportions. Ammonia is generated and expelled or withdrawn under vacuum, and the desired compound is ultimately found partially in solution from which it crystallizes on cooling. It also settles in the system as a liquid bottom layer which solidifies on cooling.

Another method of preparing an amidine thiocyanate, such as the thiocyanate of diphenyl guanidine is to fuse diphenyl guanidine with ammonium thiocyanate, preferably under vacuum to aid in the removal of ammonia. A further and more desirable method is to introduce the amidine, such as diphenyl guanidine, into a cold aqueous solution of thiocyanic acid, or an organic solvent solution of thiocyanic acid (HSCN), such as an ether solution of thiocyanic acid, obtained in known manner respectively by distilling a thiocyanate with an acid or extracting with the organic solvent an acidified aqueous thiocyanate solution.

The purity of the product in the above methods is increased by recrystallization of the crudes from a solvent.

Each of the above-mentioned amidine thiocyanates is produced in an analogous manner. In addition, the thiocyanate of guanyl urea (dicyandiamidine) is produced by hydrolyzing dicyandiamid in an aqueous solution of thiocyanic acid or in a mixture of ammonium thiocyanate and a strong mineral acid, or by double decomposition of barium thiocyanate (Ba(SCN)$_2$) with dicyandiamidine sulfate.

As illustrations of this invention, the following compositions were prepared:

| | Composition, parts by weight | |
|---|---|---|
| | A | B |
| Rubber | 100 | 100 |
| Carbon black | | 45 |
| Zinc oxide | 10 | 115 |
| Stearic acid | 1 | 4 |
| Pine tar | | 3 |
| Sulfur | 2.5 | 3 |
| Ureka C | .6 | .6 |
| Activator | .4 | .4 |

The activator referred to in the above table represents any of the amidine compounds herein mentioned. They are incorporated into the rubber mixes in finely divided form, the particle size preferably being such as to pass through a 200 mesh sieve. Substantial traces of these compounds are effective. Additions of between substantially 0.1% and 1% of the rubber in the composition are generally satisfactory, a preferred proportion being about 0.4% in the presence of thiazoles.

An amidine such as diphenyl guanidine or the like, and ammonium thiocyanate may be added to a rubber mix separately or preferably in admixture with each other and chemically uncombined. The processing of the rubber mix, e. g., on the rolls, etc., will cause these compounds to react in situ to form the amidine thiocyanate which promotes vulcanization. Alternatively, the amidine and thiocyanate may be added as a powdered melt.

"Ureka C," referred to in the above table, represents a specific example of a thiazole accelerator, namely, benzothiazolethiol benzoate.

The compositions A and B were vulcanized in a heated mold for varying times at temperatures indicated in the table below. Cured rubber products were obtained in each case having the properties tabulated.

porating in the rubber compound a small amount of an accelerator composition containing as an

*Table I*

| Activator (with mix A) | Cure time, mins. (274° F.) | Moduli of elasticity in lbs./in.$^2$ at elongations of— | | | Tensile at break, lbs./in.$^2$ | Elongation at break, per cent |
|---|---|---|---|---|---|---|
| | | 300% | 500% | 700% | | |
| Diphenylguanidine thiocyanate | 10 | 50 | 220 | 490 | 990 | 850 |
| | 20 | 190 | 520 | 1,860 | 2,770 | 763 |
| | 30 | 240 | 560 | 2,410 | 3,390 | 757 |
| | 45 | 260 | 790 | 3,010 | 3,870 | 750 |
| | 60 | 260 | 750 | 2,840 | 3,540 | 737 |
| | 90 | 270 | 650 | 2,510 | 3,460 | 747 |
| Diorthotolylguanidine thiocyanate | 10 | 110 | 160 | 490 | 1,080 | 830 |
| | 20 | 220 | 520 | 2,130 | 3,270 | 777 |
| | 30 | 250 | 710 | 2,710 | 3,630 | 753 |
| | 45 | 280 | 810 | 3,050 | 3,900 | 735 |
| | 60 | 300 | 810 | 3,100 | 3,680 | 733 |
| | 90 | 300 | 780 | 3,050 | 3,820 | 740 |
| Orthotolylbiguanide thiocyanate | 20 | 110 | 270 | 700 | 1,460 | 830 |
| | 30 | 140 | 320 | 1,050 | 2,150 | 830 |
| | 45 | 160 | 430 | 1,430 | 2,630 | 810 |
| | 60 | 160 | 400 | 1,500 | 2,790 | 803 |
| | 90 | 190 | 510 | 1,600 | 2,880 | 800 |

*Table II*

| Activator (with mix B) | Cure time, mins. (274° F.) | Moduli of elasticity in lbs./in.$^2$ at elongations of— | | Tensile at break, lbs./in.$^2$ | Elongation at break, per cent |
|---|---|---|---|---|---|
| | | 300% | 500% | | |
| Diphenylguanidine thiocyanate | 20 | 700 | 1,560 | 2,110 | 607 |
| | 30 | 1,000 | 2,050 | 2,760 | 617 |
| | 45 | 1,200 | 2,410 | 3,150 | 603 |
| | 60 | 1,320 | 2,570 | 3,020 | 570 |
| | 75 | 1,460 | 2,790 | 3,010 | 550 |
| | 90 | 1,500 | 2,830 | 3,050 | 520 |
| Diorthotolylguanidine thiocyanate | 20 | 840 | 1,850 | 2,510 | 610 |
| | 30 | 1,100 | 2,250 | 3,090 | 620 |
| | 45 | 1,280 | 2,590 | 3,160 | 580 |
| | 60 | 1,420 | 2,800 | 3,190 | 557 |
| | 75 | 1,520 | 2,920 | 3,120 | 527 |
| | 90 | 1,600 | 2,870 | 3,090 | 510 |
| Orthotolylbiguanide thiocyanate | 20 | 570 | 1,270 | 1,550 | 570 |
| | 30 | 850 | 1,830 | 2,510 | 607 |
| | 45 | 1,100 | 2,290 | 2,980 | 607 |
| | 60 | 1,260 | 2,510 | 3,060 | 567 |
| | 75 | 1,380 | 2,640 | 3,090 | 557 |
| | 90 | 1,410 | 2,730 | 2,980 | 530 |

Other accelerator compositions containing amidine thiocyanates may be employed that are within the scope of the classes herein defined and may be substituted for the specific compounds used in the examples. Such compositions are useful in vulcanizing any of the rubbery materials that are vulcanizable, including natural rubbers such as caoutchouc, balata, and gutta percha; synthetic rubbers such as the Buna or Butyl types; or natural or artificially prepared latex. These are all designated herein by the generic term "rubber."

The thiocyanates referred to herein are the thiocyanate salts.

It is understood that the invention herein-described is not limited solely to the specific embodiments set forth, and that it is obvious to those skilled in the art that many modifications such as the application of equivalents and varying proportions are within the spirit and scope of the invention defined in the appended claims.

What is claimed is:

1. The improvement in vulcanization of rubber containing accelerators, which comprises incorporation in a rubber compound of a small amount of an accelerator composition containing as an activator the thiocyanate salt of a guanidine.

2. The improvement in vulcanization of rubber containing accelerators, which comprises incorporating in the rubber compound a small amount of an accelerator composition containing as an activator the thiocyanate salt of an aryl guanidine.

3. The improvement in vulcanization of rubber containing accelerators, which comprises incorporating in the rubber compound a small amount of the thiocyanate salt of diphenyl guanidine.

4. The improvement in vulcanization of rubber containing accelerators, which comprises incorporating in the rubber compound a small amount of the thiocyanate salt of diorthotolylguanidine.

5. The improvement in vulcanization of rubber containing accelerators, which comprises incorporating in the rubber compound a small amount of the thiocyanate salt of orthotolylbiguanide.

6. A process of preparing a vulcanized rubber product which comprises mixing a vulcanizable rubber composition with a thiazole accelerator and an activator comprising the thiocyanate salt of a guanidine, and vulcanizing the rubber.

7. A process of preparing a vulcanized rubber product which comprises mixing a vulcanizable rubber composition with an accelerator comprising benzothiazolethiol benzoate and an activator comprising the thiocyanate salt of a guanidine, and vulcanizing the rubber.

8. A process of preparing a vulcanized rubber product which comprises mixing a vulcanizable rubber composition with an accelerator comprising benzothiazolethiol benzoate and an activator comprising the thiocyanate salt of diphenylguanidine and vulcanizing the rubber.

9. A process of preparing a vulcanized rubber product which comprises mixing a vulcanizable rubber composition with an accelerator comprising benzothiazolethiol benzoate and an activator comprising the thiocyanate salt of diorthotolylguanidine and vulcanizing the rubber.

10. A process of preparing a vulcanized rubber product which comprises mixing a vulcanizable rubber composition with an accelerator comprising benzothiazolethiol benzoate and an activator comprising the thiocyanate salt of orthotolylbiguanide and vulcanizing the rubber.

11. A composition comprising rubber, a vulcanizing agent, and an accelerator containing as an activator the thiocyanate salt of a guanidine.

12. A composition comprising rubber, a vulcanizing agent, an activatable type of organic accelerator, and the thiocyanate salt of an aryl substituted guanidine.

13. A product comprising rubber vulcanized in the presence of an accelerator activated by the thiocynate salt of a guanidine.

14. A product comprising rubber vulcanized in the presence of a thiazole accelerator and the thiocyanate salt of an aryl substituted guanidine.

15. A method comprising vulcanizing a rubber in the presence of an accelerator containing as an activator the thiocyanate salt of a guanidine.

16. A method comprising vulcanizing a rubber in the presence of a thiazole accelerator and the thiocyanate salt of an aryl substituted guanidine.

17. A method comprising vulcanizing a rubber in the presence of a thiazole accelerator and the thiocyanate salt of diphenylguanidine.

18. A method comprising vulcanizing a rubber in the presence of a thiazole accelerator and the thiocyanate salt of diorthotolylguanidine.

19. A method comprising vulcanizing a rubber in the presence of a thiazole accelerator and the thiocyanate salt of orthotolylbiguanide.

WILLIAM H. HILL.